(12) United States Patent
Eld et al.

(10) Patent No.: US 7,185,050 B2
(45) Date of Patent: Feb. 27, 2007

(54) DOCUMENT MANAGEMENT SYSTEM AND METHOD USING CONTENT GROUPING SYSTEM

(75) Inventors: Kevin David Eld, Meridian, ID (US); Steven Frederick Hedges, Meridian, ID (US); Gregory Robert Thayer, Eagle, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1000 days.

(21) Appl. No.: 09/845,813

(22) Filed: Apr. 30, 2001

(65) Prior Publication Data

US 2002/0161800 A1    Oct. 31, 2002

(51) Int. Cl.
    *G06F 15/16*    (2006.01)
(52) U.S. Cl. ...................................... 709/203
(58) Field of Classification Search ............... 709/219, 709/200, 201–203, 238–244; 713/193; 715/531, 715/513, 526–529; 705/7; 707/100
See application file for complete search history.

(56) References Cited

U.S. PATENT DOCUMENTS

| | | | |
|---|---|---|---|
| 5,467,434 A | 11/1995 | Hower, Jr. et al. | |
| 5,970,475 A | 10/1999 | Barnes et al. | |
| 6,006,242 A * | 12/1999 | Poole et al. | 715/531 |
| 6,510,458 B1 * | 1/2003 | Berstis et al. | 709/219 |
| 6,658,568 B1 * | 12/2003 | Ginter et al. | 713/193 |
| 2002/0120481 A1 * | 8/2002 | Woods et al. | 705/7 |
| 2002/0143782 A1 * | 10/2002 | Headings et al. | 707/100 |

FOREIGN PATENT DOCUMENTS

WO      WO 00/03342      1/2000

OTHER PUBLICATIONS

Dale, et al., "Dynamic Document Delivery: Generating Natural Language Texts on Demand", Database and Expert Systems Applications, 1998, Proceedings, Ninth Internat Workshop on Aug. 26-28, 1998, pp. 131-136.*

* cited by examiner

*Primary Examiner*—Andrew Caldwell
*Assistant Examiner*—Kelvin Lin

(57) ABSTRACT

A method of distributing a plurality of documents includes associating a metadata file with each of the documents, applying a content attribute to each of the documents and appending the metadata file of each of the documents with the content attribute, and assigning a content group to each of the documents based on the content attribute of a respective one of the documents and modifying the metadata file of each of the documents to include the content group of the respective one of the documents. In addition, the method further includes defining a plurality of content categories and associating the content group with at least one of the content categories, and distributing for the at least one of the content categories each of the documents assigned the content group.

14 Claims, 12 Drawing Sheets

DOCUMENT MANAGEMENT SYSTEM AND METHOD USING CONTENT GROUPING SYSTEM

THE FIELD OF THE INVENTION

The present invention relates generally to document services, and more particularly to a system and method of managing and distributing documents using a content grouping system.

BACKGROUND OF THE INVENTION

Publication of documents in electronic form can provide an effective avenue for distributing information to an audience. Unfortunately, managing distribution of a large number of documents for publication in electronic form is often a laborious task. A curator of such documents, for example, must maintain not only the documents themselves but also a manner in which the audience accesses such documents. Documents which are repeatedly updated and/or replaced require associated updating of the manner in which the audience accesses such documents. Any difficulty in maintaining such documents and such access, therefore, is quickly compounded by the number of documents being published.

A product manufacturer, for example, may choose to distribute product information to consumers in electronic form. As such, the product manufacturer may establish an Internet website which provides technical support features such as publication of product support documents for consumers. Thus, the product manufacturer can make a large number of product support documents readily available to consumers.

The product manufacturer, however, may produce multiple products within multiple product lines with multiple support documents being available for each product. If, for example, the product manufacturer has five product lines each including an average of five products and each of the products reference an average of 20 support documents, the product manufacturer must maintain approximately 500 documents. In addition, the product manufacturer must maintain the manner in which such documents are presented to and/or accessed by consumers. Thus, any links between the Internet website and the documents and grouping or listing of the documents must be maintained. Existing methods of establishing and maintaining such links and/or groupings or listings, such as hard coding of document links and manually tracking document links with a database or spreadsheet, are typically labor intensive and impractical for a large number of documents.

Accordingly, a need exists for efficiently managing grouping and/or categorization of a plurality of documents and distribution of one or more of the documents to an audience such that the documents can be updated or recategorized without affecting distribution aspects of the documents and, conversely, distribution aspects of the documents can be updated and/or reconfigured without the need for updating the documents.

SUMMARY OF THE INVENTION

One aspect of the present invention provides a method of distributing a plurality of documents. The method includes associating a metadata file with each of the documents, applying at least one content attribute to each of the documents and appending the metadata file of each of the documents with the at least one content attribute, and assigning at least one content group to each of the documents based on the at least one content attribute of a respective one of the documents and modifying the metadata file of each of the documents to include the at least one content group of the respective one of the documents. As such, the method further includes distributing the documents based on the at least one content group of each of the documents.

Another aspect of the present invention provides a method of distributing a plurality of documents. The method includes associating a metadata file with each of the documents, applying a content attribute to each of the documents and appending the metadata file of each of the documents with the content attribute, and assigning a content group to each of the documents based on the content attribute of a respective one of the documents and modifying the metadata file of each of the documents to include the content group of the respective one of the documents. In addition, the method further includes defining a plurality of content categories and associating the content group with at least one of the content categories, and distributing for the at least one of the content categories each of the documents assigned the content group.

Another aspect of the present invention provides a document management system adapted to manage distribution of a plurality of documents. The document management system includes a metadata architecture system adapted to apply at least one content attribute to each of the documents, a logic rules application system adapted to assign at least one content group to each of the documents based on the at least one content attribute of a respective one of the documents, and a document distribution system adapted to distribute the documents based on the at least one content group of each of the documents. As such, the metadata architecture system is adapted to append a metadata file of each of the documents with the at least one content attribute and the logic rules application system is adapted to modify the metadata file of each of the documents to include the at least one content group of the respective one of the documents.

In one embodiment, the present invention provides a system and method of managing a plurality of documents, including distributing one or more of the documents. The system and method utilizes a content grouping system to effectively manage categorization of the documents into content groups and distribution of the documents based on the content groups.

DESCRIPTION OF THE PREFERRED EMBODIMENTS

In the following detailed description of the preferred embodiments, reference is made to the accompanying drawings which form a part hereof, and in which is shown by way of illustration specific embodiments in which the invention may be practiced. It is to be understood that other embodiments may be utilized and structural or logical changes may be made without departing from the scope of the present invention. The following detailed description, therefore, is not to be taken in a limiting sense, and the scope of the present invention is defined by the appended claims.

Figure 1:
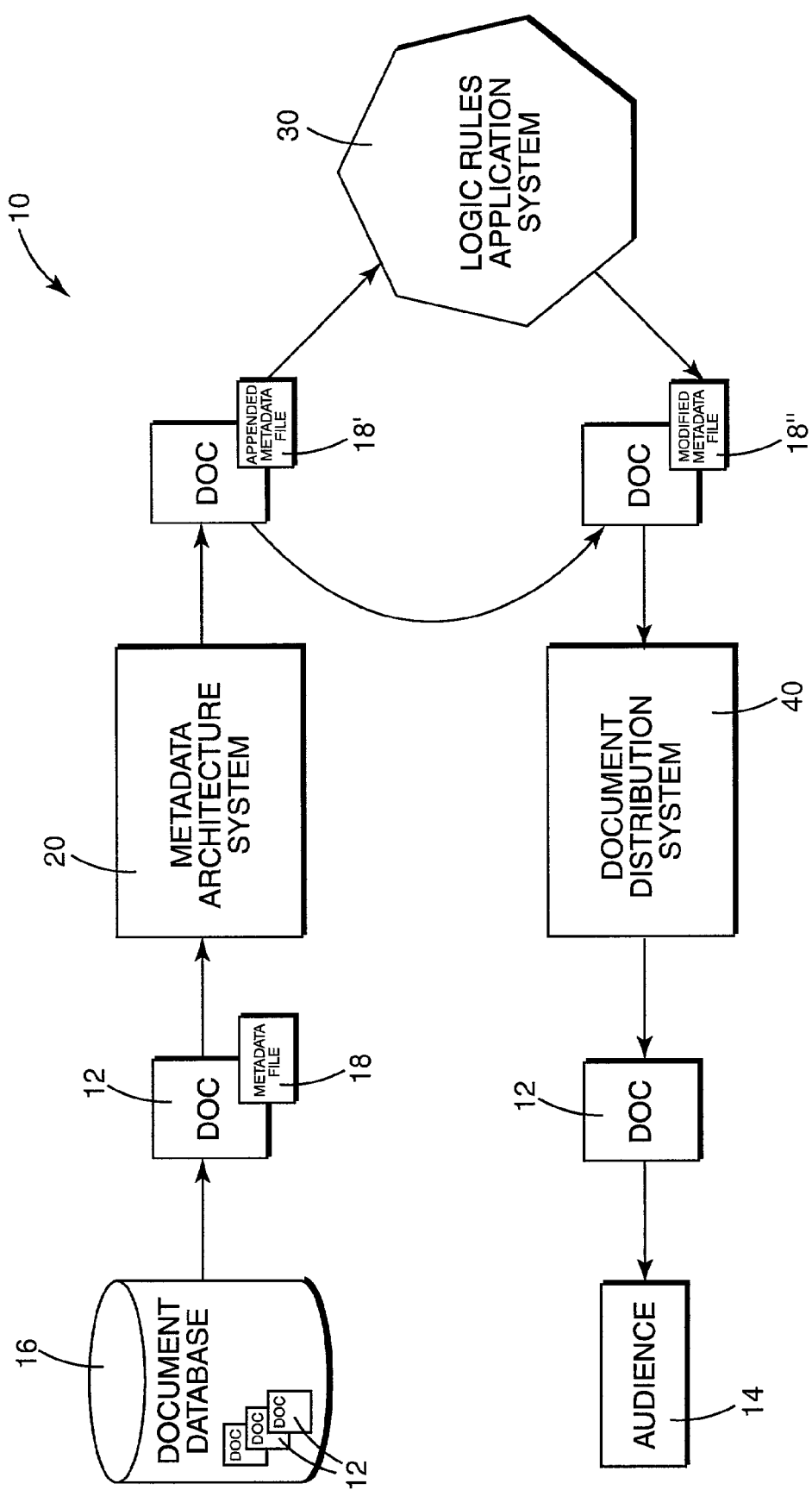
FIG. 1 is a block diagram illustrating one exemplary embodiment of a document management system according to the present invention.

A document management system according to the present invention is illustrated generally at 10 in FIG. 1. Document management system 10 provides for categorization and distribution of a plurality of documents 12 based on a content of documents 12. Document management system 10 facilitates distribution of documents 12, for example, to an audience 14. Audience 14, as used herein, is defined to include any requestor and/or recipient of documents 12 such as a consumer, an employee, or a system.

Document management system 10 and other embodiments of the document management system according to the present invention include several main components, one or more of which may be a software program. The software program components of the document management system according to the present invention run on one or more computer or server systems. Programming languages suitable for use with the present invention will become apparent to one skilled in the art after reading the present application.

In one exemplary embodiment, as illustrated in FIG. 1, document management system 10 includes a document management data storage system 16. Document management data storage system 16 constitutes a database of one or more data files for document management system 10. Thus, document management data storage system 16 maintains or stores data files of documents 12 to be categorized and distributed by document management system 10. Examples of document management data storage system 16 include non-volatile memory (e.g., a hard disk drive or other persistent storage device) and may include volatile memory (e.g., random access memory (RAM)). Another example of document management data storage system 16 may include a relational database management server (RDBMS).

In one exemplary embodiment, document management system 10 includes document management data storage system 16, a metadata architecture system 20, a logic rules application system 30, and a document distribution system 40. As such, documents 12 from document management data storage system 16 provide input to metadata architecture system 20 which, in turn, provides input to logic rules application system 30. Logic rules application system 30, therefore, provides input to document distribution system 40 which, in turn, distributes documents 12 to audience 14 based on processing by metadata architecture system 20 and logic rules application system 30.

Document management system 10, including metadata architecture system 20, logic rules application system 30, and/or document distribution system 40 includes hardware, software, firmware, or a combination of these. In one preferred embodiment, document management system 10, including metadata architecture system 20, logic rules application system 30, and/or document distribution system 40 includes a computer server or other microprocessor based system capable of performing a sequence of logic operations. In addition, document management system 10, including metadata architecture system 20, logic rules application system 30, and/or document distribution system 40 can include a microprocessor embedded system/appliance incorporating tailored appliance hardware and/or dedicated single purpose hardware.

Figure 2:
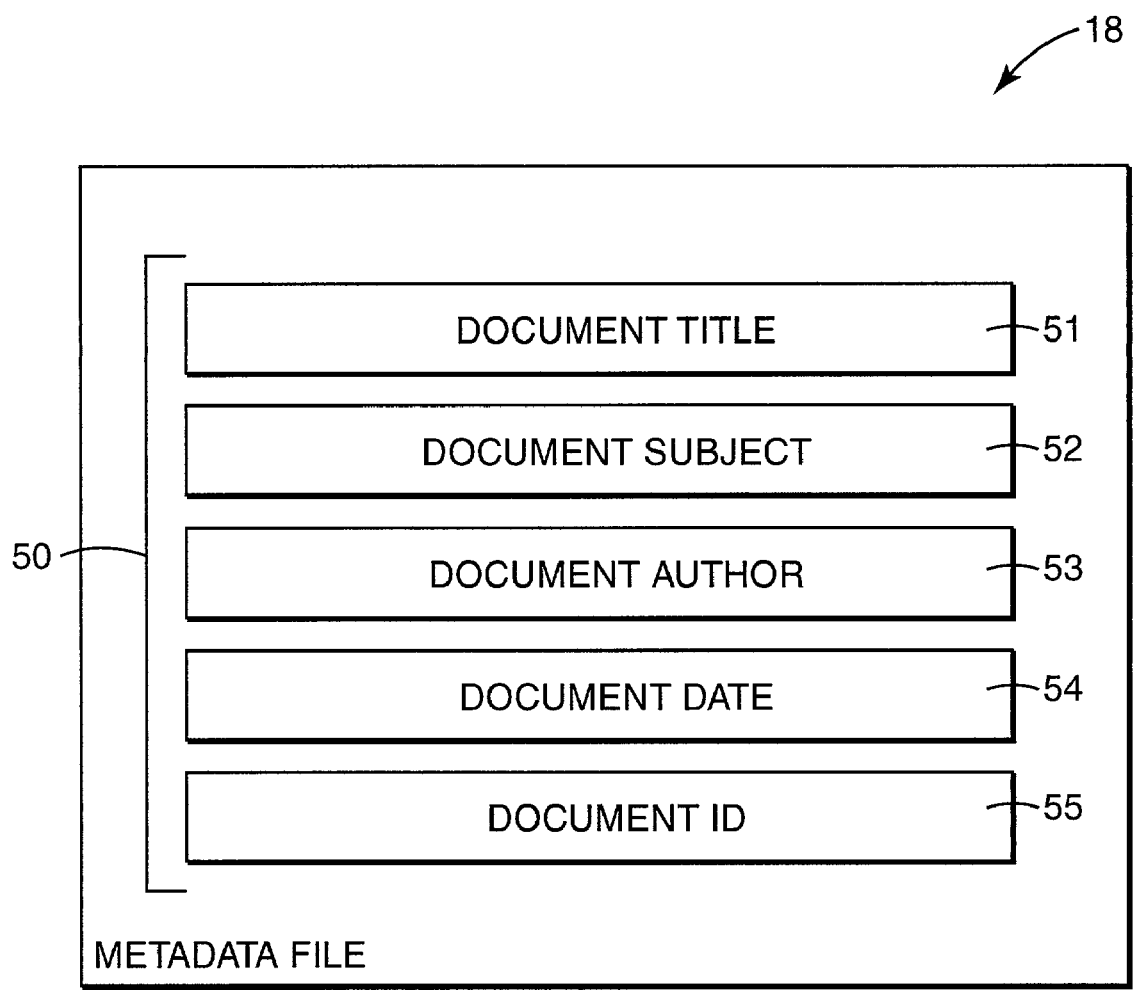
FIG. 2 is a diagram illustrating one exemplary embodiment of a metadata file associated with a document in the document management system of FIG. 1.

In one exemplary embodiment, a metadata file 18 is associated with each document 12. As such, documents 12 are input to metadata architecture system 20 with respective metadata files 18. In one exemplary embodiment, as illustrated in FIG. 2, each metadata file 18 includes a plurality of document attributes 50. Document attributes 50 identify information about respective documents 12. Document attributes 50 include, for example, a title attribute 51 of a respective document 12, a subject attribute 52 of a respective document 12, an author or authors attribute 53 of a respective document 12, a date attribute 54 of a respective document 12, and/or an identification attribute 55 of a respective document 12. Identification attribute 55 of documents 12 includes, for example, a file name and/or file path of documents 12.

Figure 3:
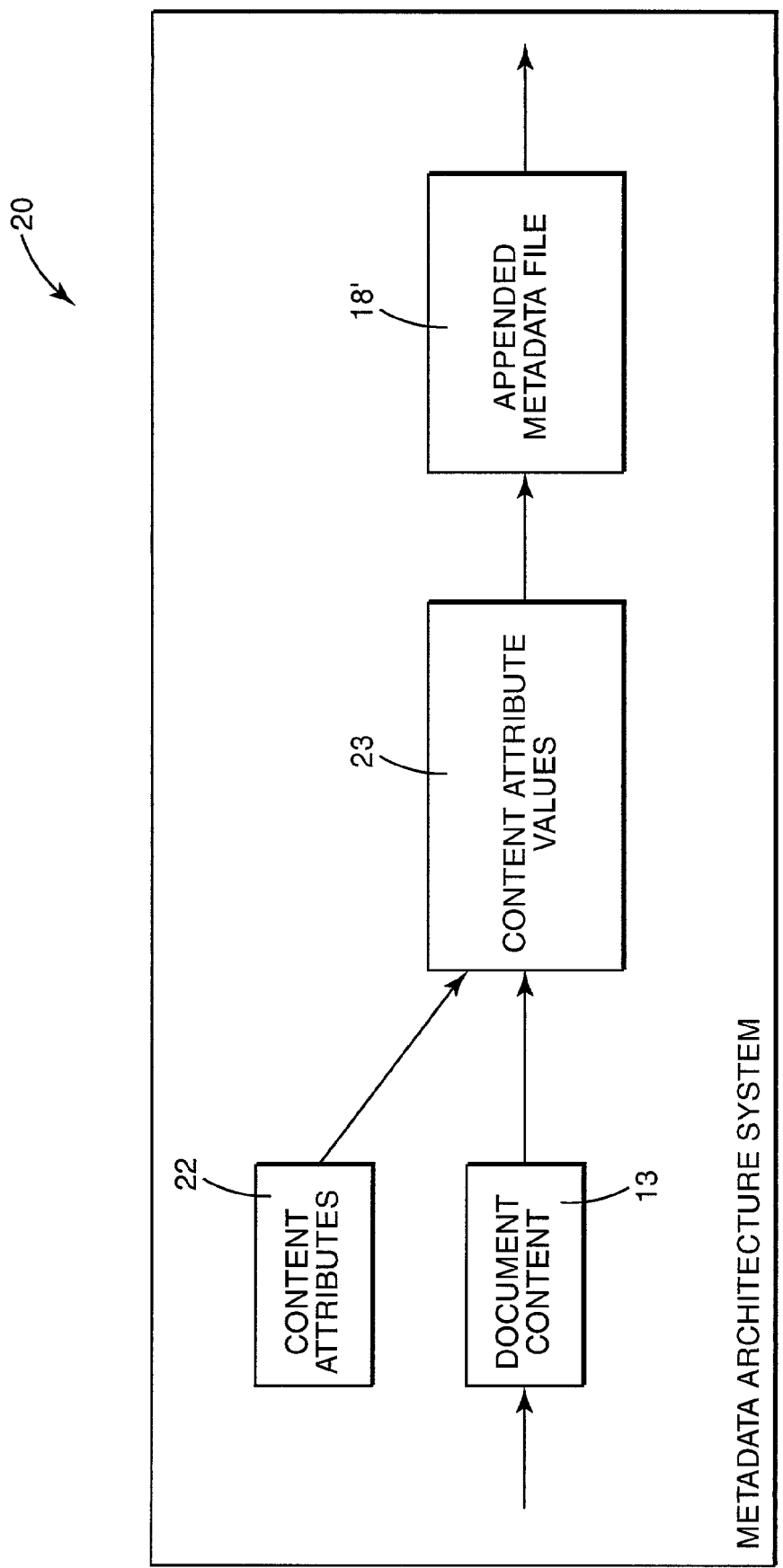
FIG. 3 is a block diagram illustrating one exemplary embodiment of a metadata architecture system of the document management system of FIG. 1.
Figure 4:
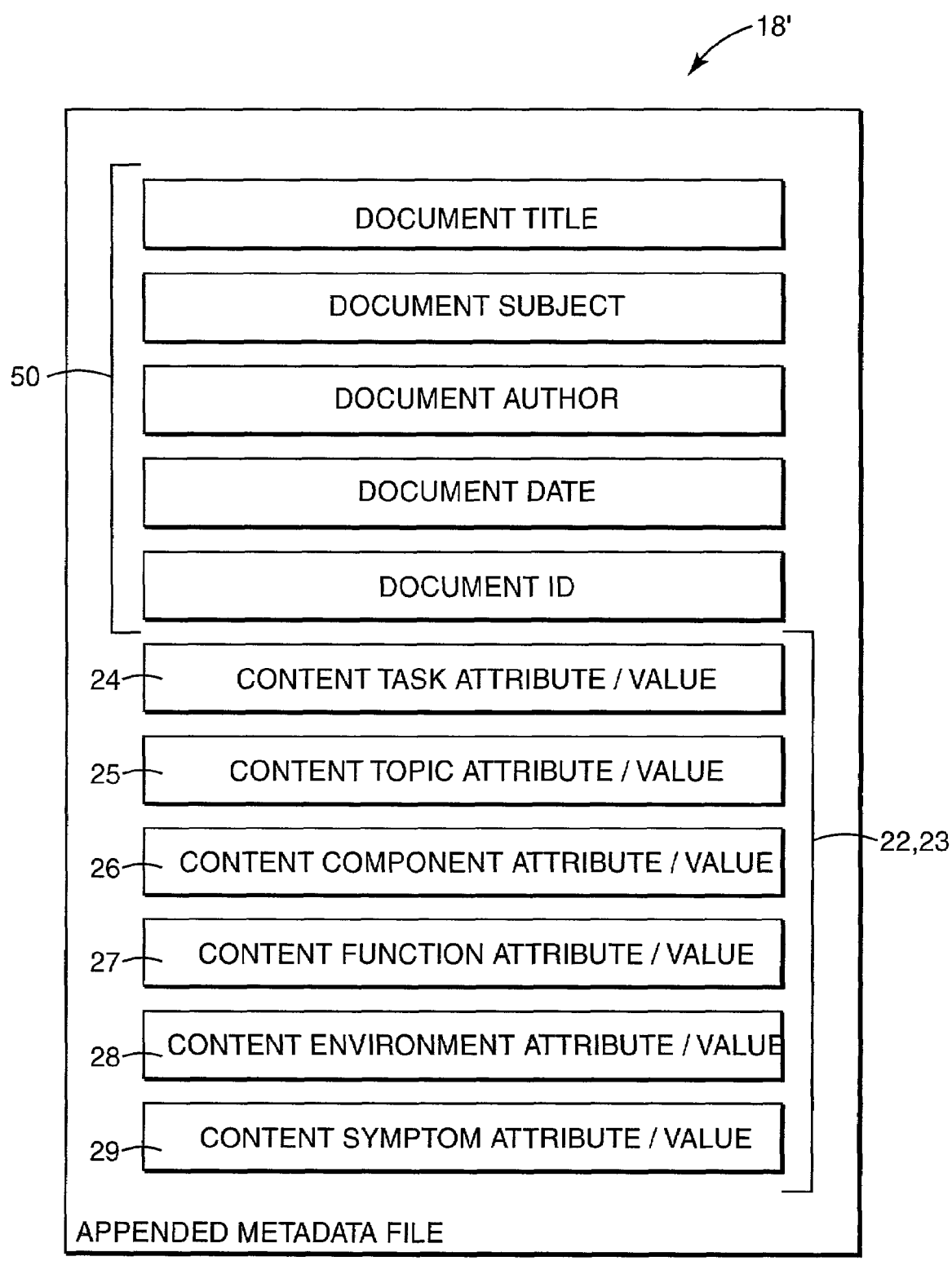
FIG. 4 is a diagram illustrating one exemplary embodiment of an appended metadata file associated with a document by the metadata architecture system of FIG. 3.

As illustrated in FIGS. 3 and 4, metadata architecture system 20 defines a plurality of content attributes 22 and applies one or more content attributes 22 to documents 12. Content attributes 22 identify matters described and/or dealt with in respective documents 12. As such, metadata architecture system 20 analyzes a document content 13 of documents 12 and assigns content attribute values 23 to content attributes 22 based on document content 13. In addition, metadata architecture system 20 appends metadata file 18 of documents 12 with content attributes 22 and respective content attribute values 23.

In one exemplary embodiment, as illustrated in FIG. 4, appended metadata file 18' includes document attributes 50 as well as content attributes 22 and respective content attribute values 23. Content attributes 22 include, for example, a task attribute 24 of documents 12, a topic attribute 25 of documents 12, a component attribute 26 of documents 12, a function attribute 27 of documents 12, an environment attribute 28 of documents 12, and/or a symptom attribute 29 of documents 12. Task attribute 24 identifies a task or effort described and/or dealt with in document content 13 of a respective document 12 and topic attribute 25 identifies a topic described and/or dealt with in document content 13 of a respective document 12. Component attribute 26 identifies a component or element described and/or dealt with in document content 13 of a respective document 12 and function attribute 27 identifies a function or duty described and/or dealt with in document content 13 of a respective document 12. Environment attribute 28 identifies an environment or context described and/or dealt with in document content 13 of a respective document 12 and symptom attribute 29 identifies a symptom or condition described and/or dealt with in document content 13 of a respective document 12. As such, task attribute 24, topic attribute 25, component attribute 26, function attribute 27, environment attribute 28, and symptom attribute 29 each include a respective content attribute vale 23 as assigned by metadata architecture system 20.

Figure 5:
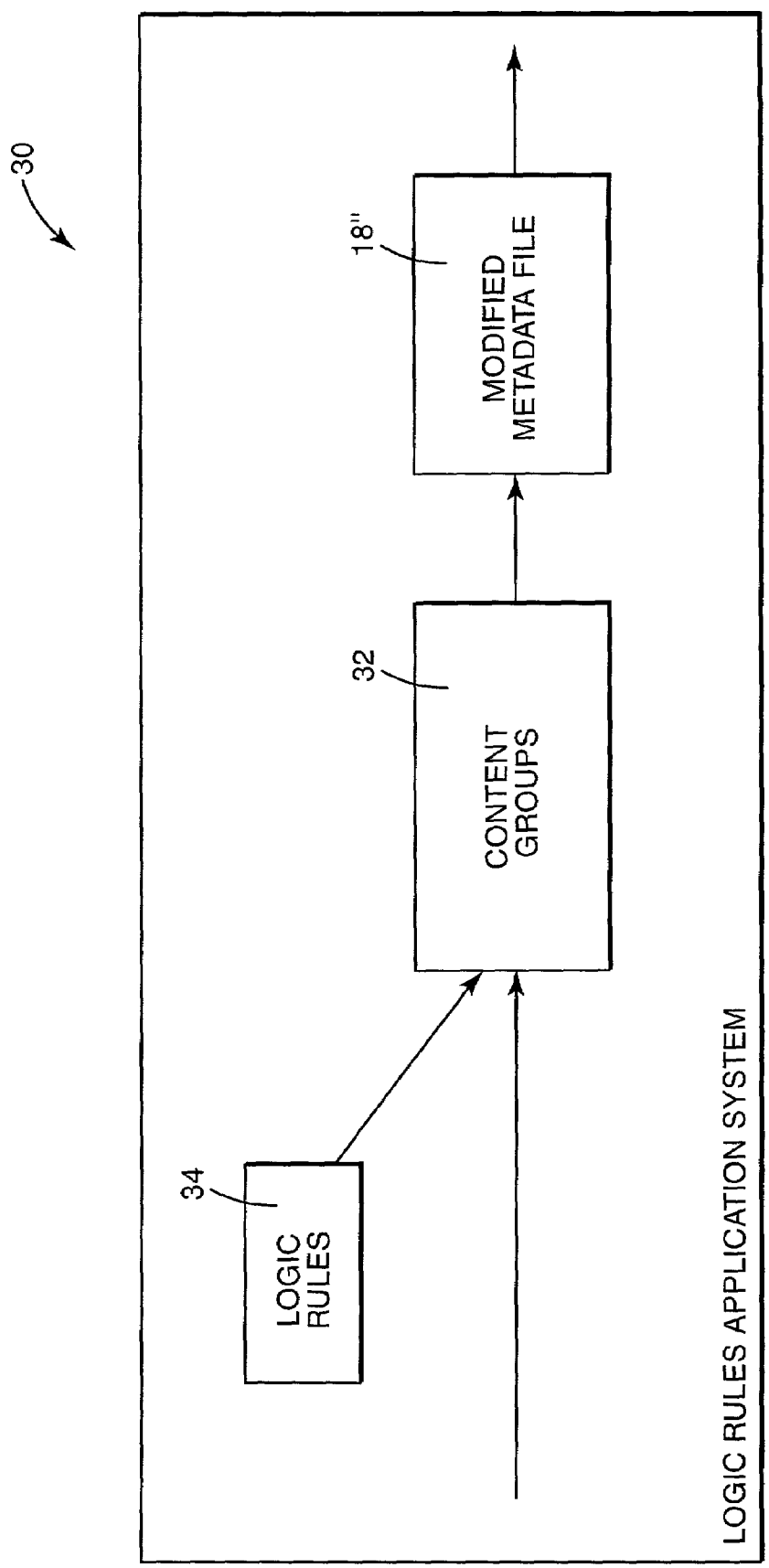
FIG. 5 is a block diagram illustrating one exemplary embodiment of a logic rules application system of the document management system of FIG. 1.
Figure 6:
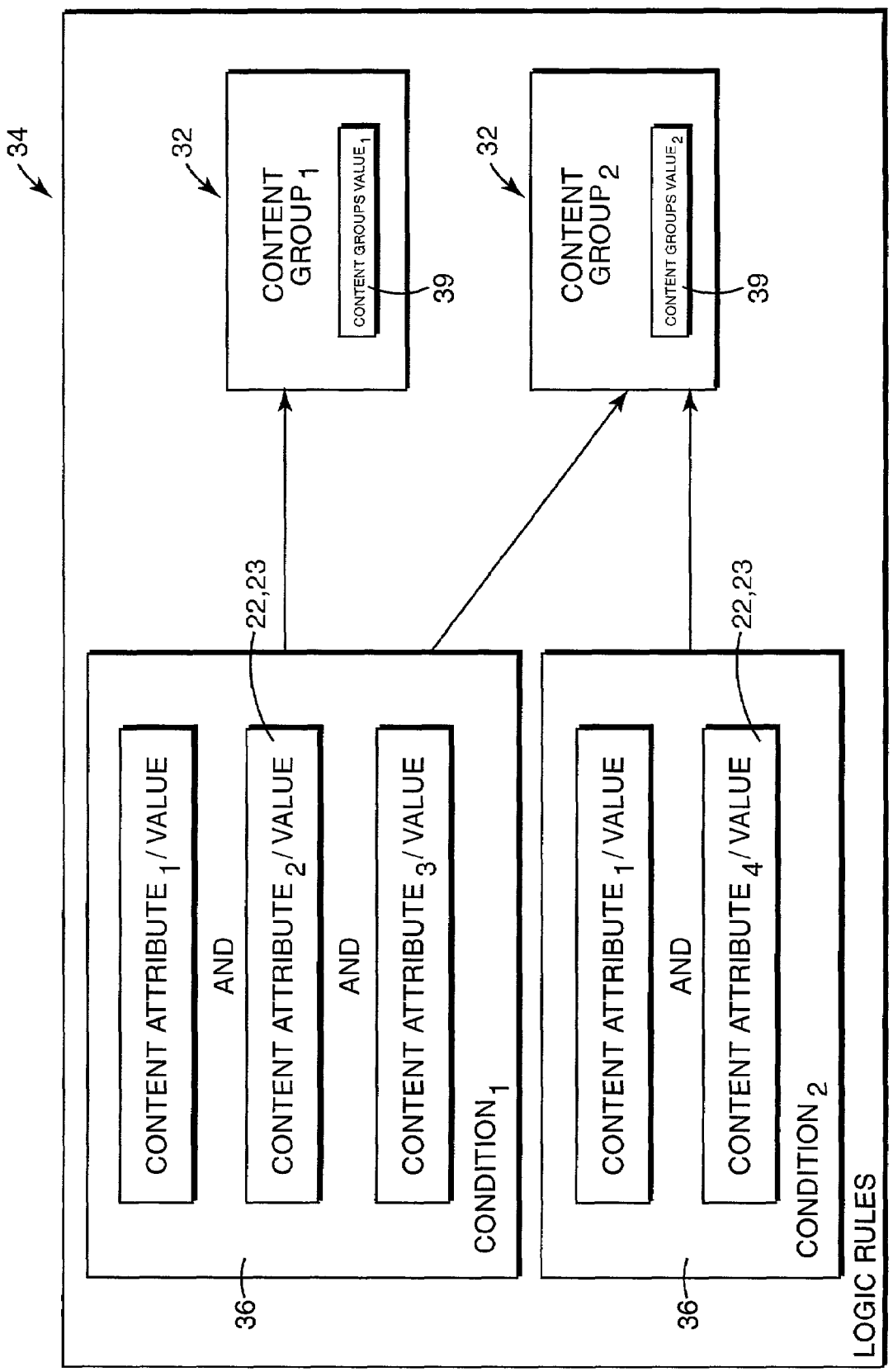
FIG. 6 is a diagram illustrating one exemplary embodiment of logic rules of the logic rules application system of FIG. 5.
Figure 7:
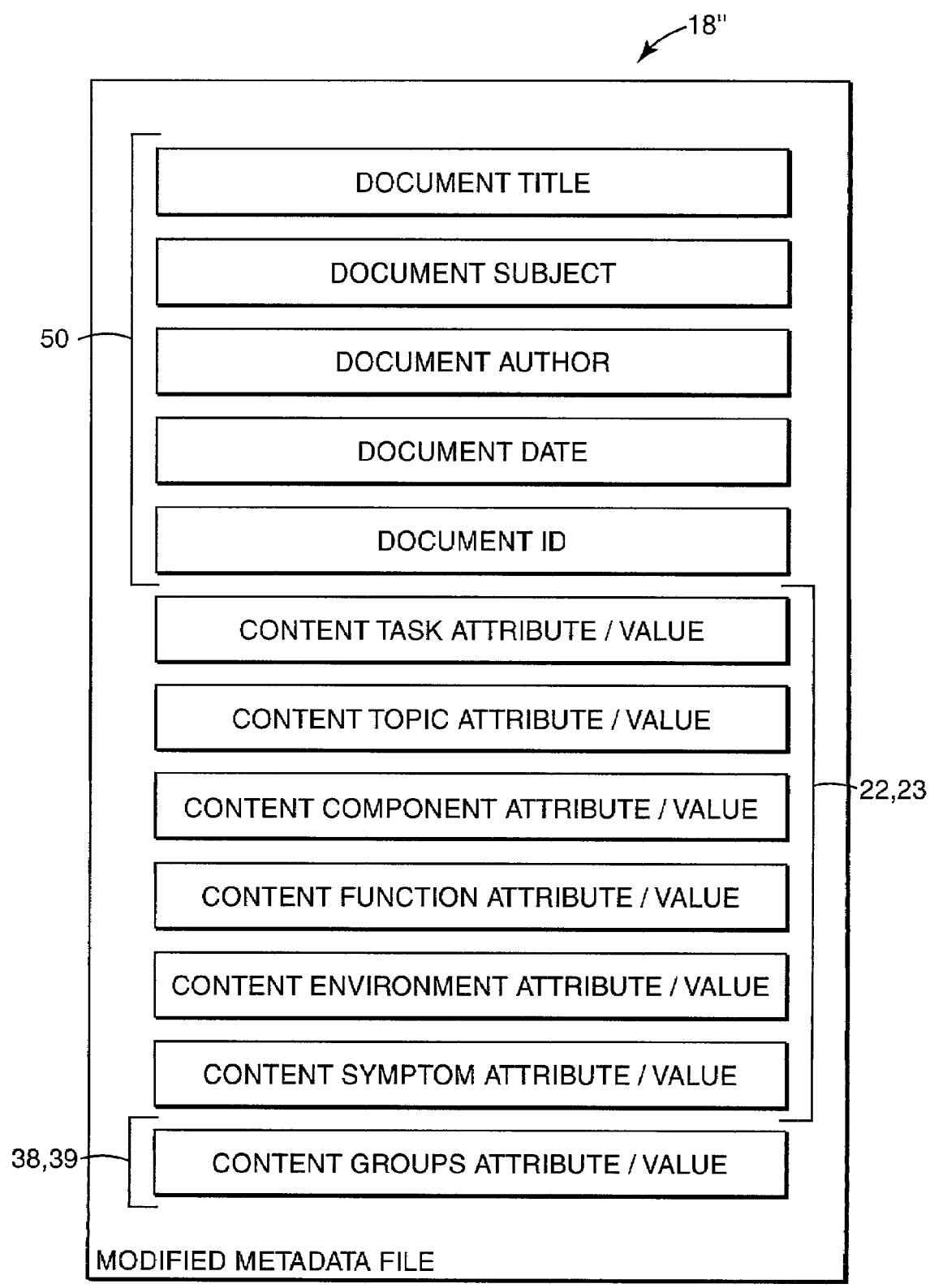
FIG. 7 is a diagram illustrating one exemplary embodiment of a modified metadata file associated with a document by the logic rules application system of FIG. 5.

As illustrated in FIGS. 5–7, logic rules application system 30 defines a plurality of content groups 32 for documents 12 and assigns one or more content groups 32 to documents 12. Content groups 32 are assigned to documents 12 based on content attributes 22 and respective content attribute values 23 of documents 12 as applied and assigned by metadata architecture system 20. As such, logic rules application system 30 categorizes documents 12 into content groups 32 based on document content 13.

In one exemplary embodiment, logic rules application system 30 assigns content groups 32 to documents 12 based on one or more logic rules 34. As illustrated in FIG. 6, logic rules 34 each identify one or more conditions 36 for each content group 32. Conditions 36, in turn, each identify one or more content attributes 22 and content attribute values 23 of documents 12. As such, logic rules application system 30 compares content attributes 22 and content attribute values 23 of documents 12 with conditions 36 of logic rules 34 to determine if documents 12 satisfy one or more conditions 36 of one or more logic rules 34. Thus, if one or more documents 12 satisfy one or more conditions 36 of respective logic rules 34, logic rules application system 30 assigns a respective content group 32 to the respective documents 12.

In one exemplary embodiment, logic rules application system 30 defines a content groups attribute 38 for documents 12 and assigns one or more content groups values 39 to content groups attributes 38 for documents 12 based on logic rules 34. As such, logic rules application system 30 modifies appended metadata file 18' by adding content groups attribute 38 and respective content groups values 39. Thus, modified metadata file 18", as illustrated in FIG. 7, includes document attributes 50, content attributes 22 and respective content attribute values 23, and content groups attribute 38 and respective content groups values 39.

Figure 8:
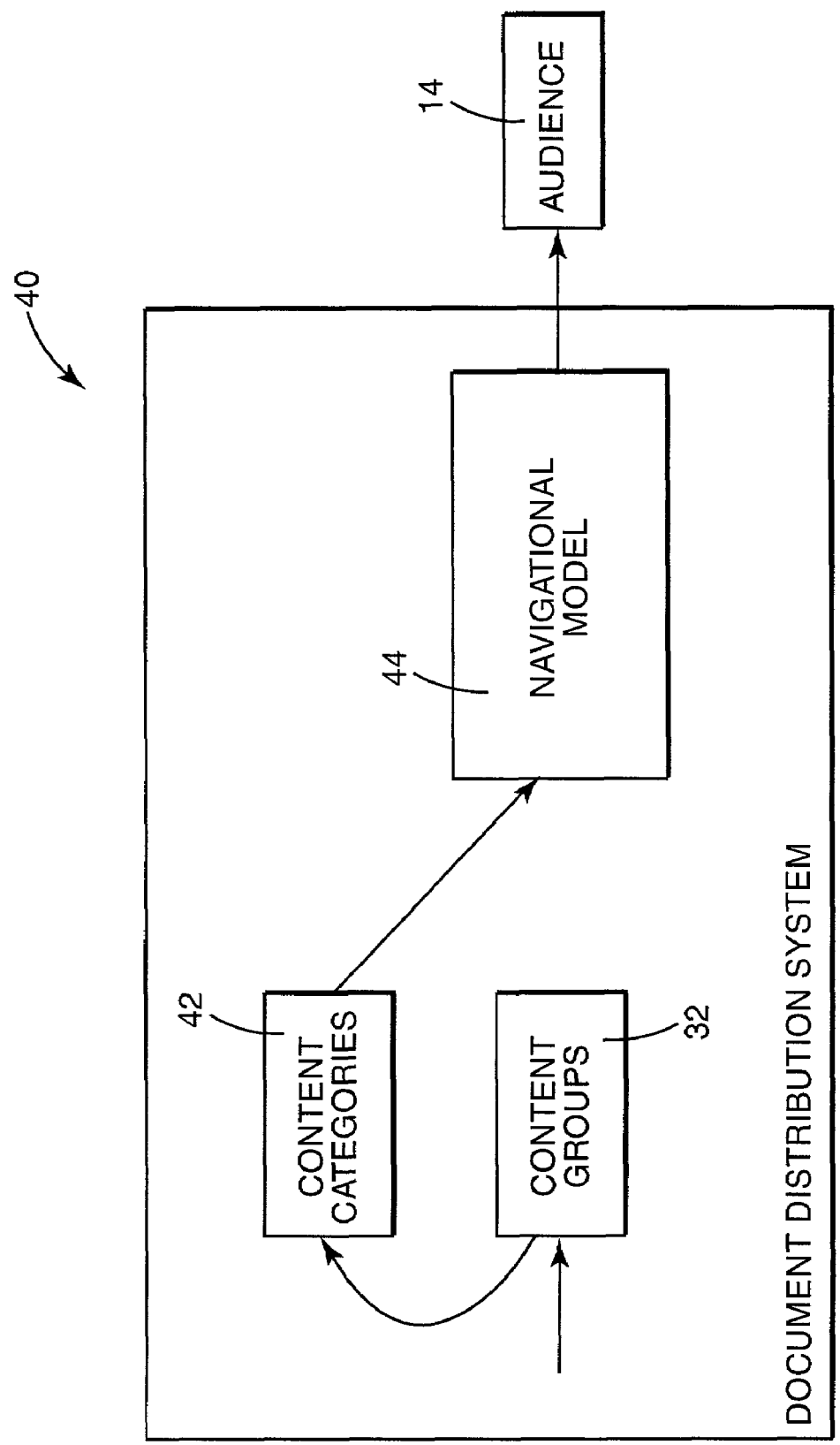
FIG. 8 is a block diagram illustrating one exemplary embodiment of a document distribution system of the document management system of FIG. 1.
Figure 9:
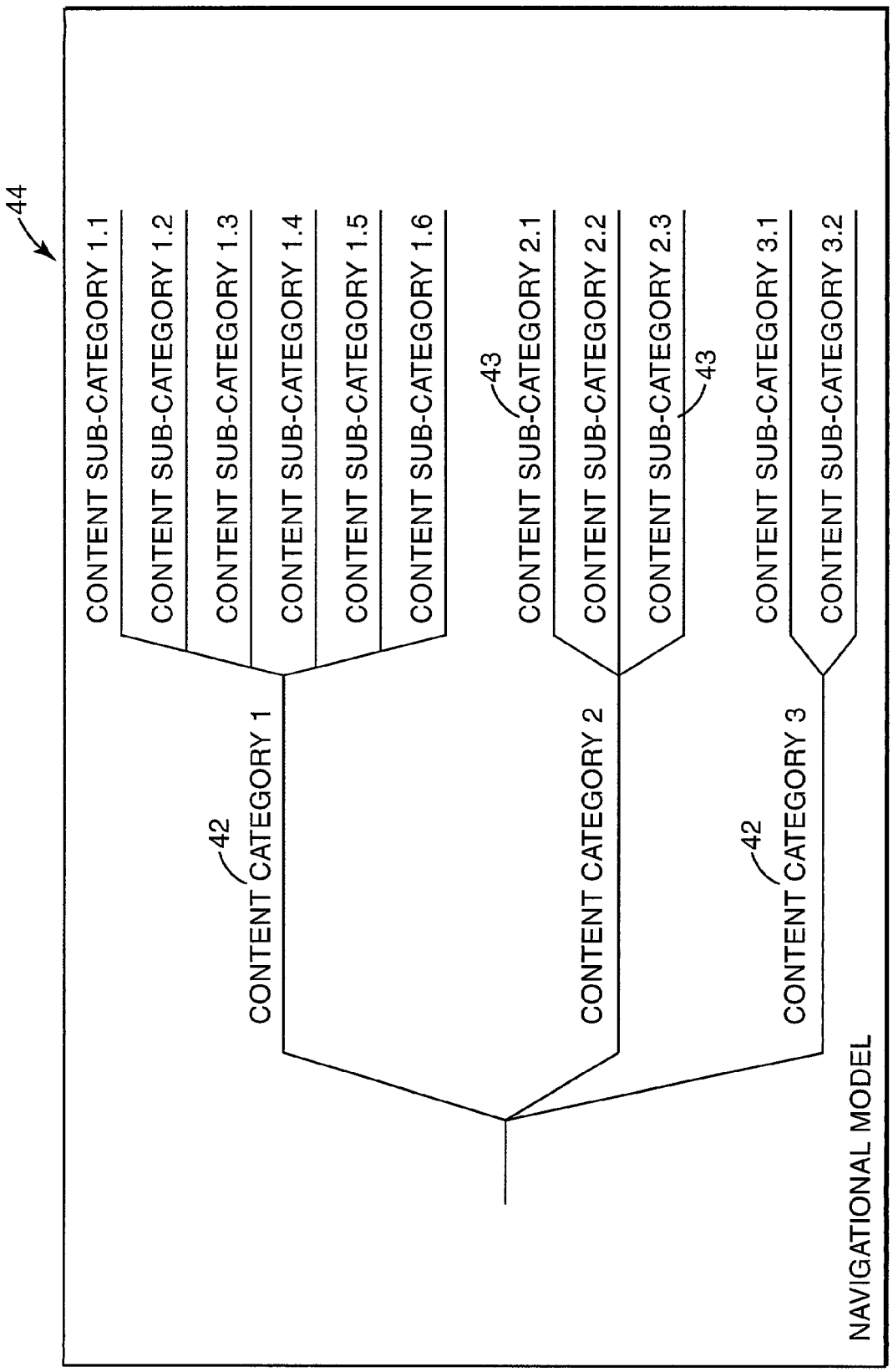
FIG. 9 is a diagram illustrating one exemplary embodiment of a plurality of content categories of a navigational model of the document distribution system of FIG. 8.
Figure 10:
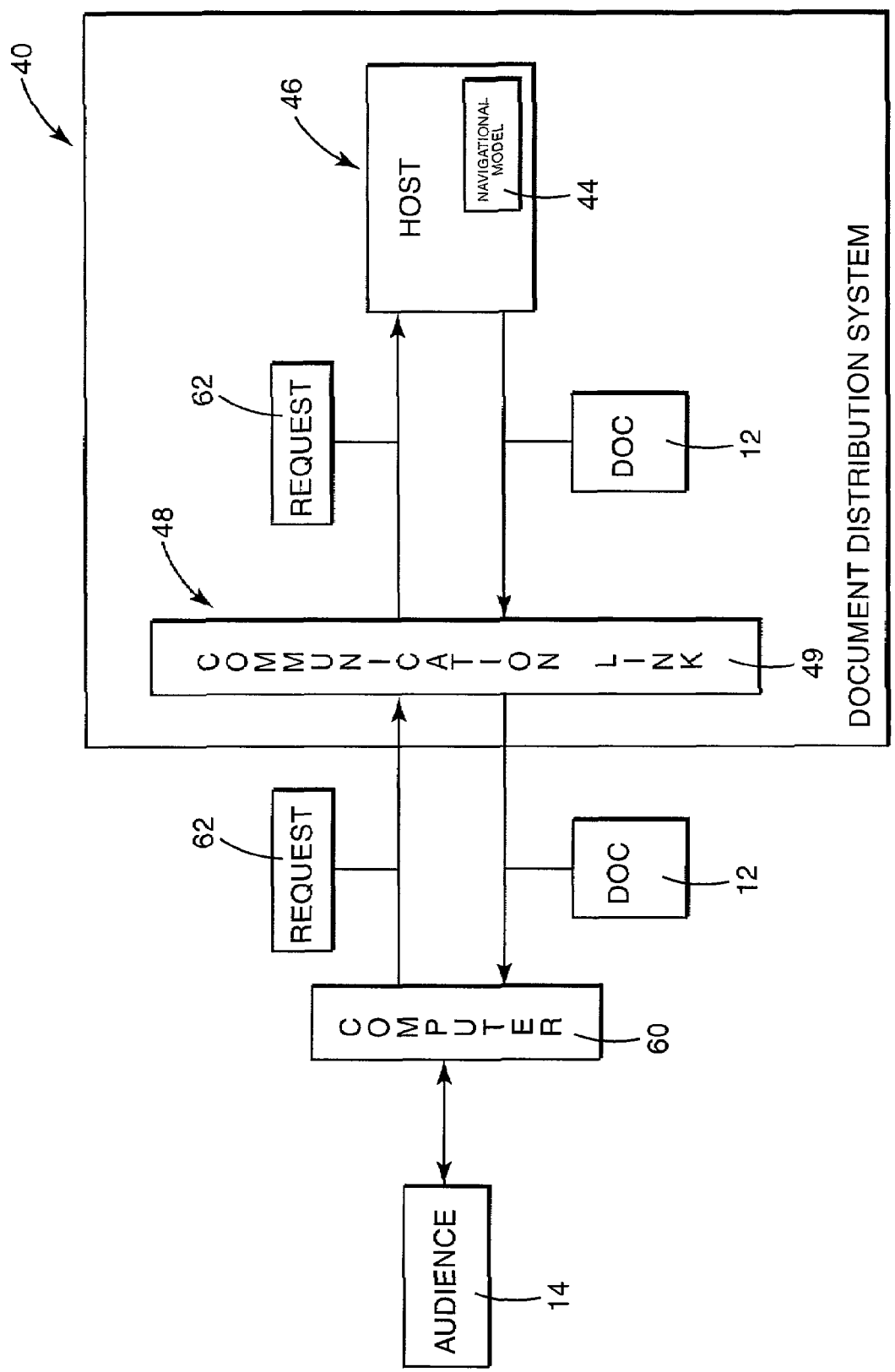
FIG. 10 is a block diagram illustrating one exemplary embodiment of communications between a host of the document distribution system of FIG. 8 and an audience.

As illustrated in FIGS. 8–10, document distribution system 40 defines a plurality of content categories 42 and associates content groups 32, as defined by logic rules application system 30, with content categories 42. In addition, document distribution system 40 defines a navigational model 44 which identifies content categories 42. As such, document distribution system 40 presents navigational model 44 to audience 14. Thus, document distribution system 40 facilitates distribution of documents 12 to audience 14.

In one exemplary embodiment, as illustrated in FIG. 9, navigational model 44 defines a hierarchy of content categories 42 which are developed and arranged for use, for example, by audience 14. Content categories 42 identify, for example, different topics and/or issues of relevance to audience 14. In one exemplary embodiment, one or more content categories 42 include one or more content sub-categories 43. Content sub-categories 43, therefore, further define content categories 42. As such, one or more content groups 32, as defined by logic rules application system 30, are associated or linked with each content category 42 and/or content sub-category 43.

As illustrated in FIG. 10, document distribution system 40 includes a host 46 which maintains navigational model 44 and facilitates distribution of documents 12 to audience 14. Host 46 can be or can be included in a computer server or other microprocessor-based system capable of performing a sequence of logic operations and includes hardware, software, firmware, or a combination of these. In addition, host 46 can include a microprocessor embedded system/appliance incorporating tailored appliance hardware and/or dedicated single purpose hardware.

In one exemplary embodiment, audience 14 and host 46 communicate with each other via a communication link 48. Communication link 48, as used herein, is defined to include an internet communication link, an intranet communication link, or similar high-speed communication link including a wireless communication link. Thus, communication link 48 is defined to include a local-area network (LAN) and/or a wide-area network (WAN). In one preferred embodiment, communication link 48 includes an Internet communication link 49.

In one exemplary embodiment, audience 14 and host 46 are located remote from each other (i.e., at different locations). Thus, communications between audience 14 and host 46 are conducted over communication link 48. Preferably, audience 14 and host 46 communicate with each other via Internet communication link 49. It is, however, within the scope of the present invention for audience 14 and host 46 to communicate with each other in other manners (e.g., a direct connection).

Audience 14 interacts with document distribution system 40 via a computer 60. More specifically, audience 14 interacts with host 46 of document distribution system 40 via computer 60 to browse or navigate navigational model 44 and review content categories 42 and/or content sub-categories 43. It is, however, within the scope of the present invention for computer 60 to be and/or be included in audience 14 and/or for audience 14 to be and/or be included in computer 60.

In one exemplary embodiment, computer 60 runs an operating system which can support one or more applications. The operating system is stored in memory and executes on a processor. The operating system is preferably a multi-tasking operating system which allows simultaneous execution of multiple applications, although aspects of the present invention may be implemented using a single-tasking operating system. Computer 60 may include, for example, an input device such as a keyboard and/or a mouse and a display device such as a monitor, as is well known in the art. Computer 60 may be an appliance such as a personal digital assistant (PDA), scanner, camera, cellular phone, etc.

In one exemplary embodiment, audience 14 interacts with computer 60 to generate and submit a document request 62 to document distribution system 40. Document request 62 identifies, for example, for which content category 42 or content sub-category 43 audience 14 would like to receive documents 12. As such, host 46 of document distribution system 40 receives and processes document request 62. Host 46, therefore, distributes those documents 12 having content groups 32 which are associated with the requested content category 42 or content sub-category 43. Preferably, audience 14 submits document request 62 to document distribution system 40 via communication link 48. In addition, host 46 distributes document 12 to audience 14 via communication link 48.

Document distribution system 40, including host 46, can be implemented in hardware via a microprocessor, programmable logic device, or state machine, in firmware, or in software within a given device. In one aspect, at least a portion of the software programming is written in JAVA programming language, and each of the main components communicate via Internet communication link 49 using a communication bus protocol. For example, the present invention may or may not use a TCP/IP protocol suite for data transport. Other programming languages and programming bus protocols suitable for use with document distribution system 40 will become apparent to those skilled in the art after reading the present application.

Figure 11:
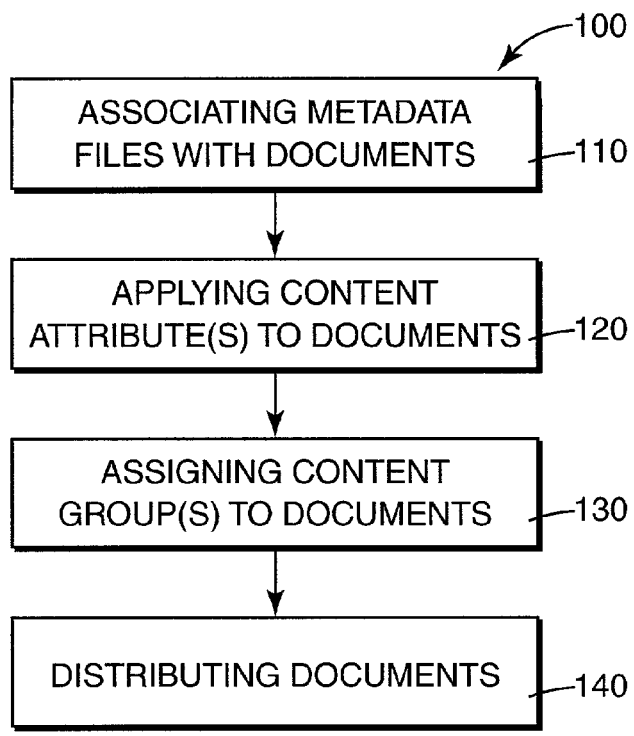
FIG. 11 is a flow diagram illustrating one exemplary embodiment of a method of distributing a plurality of documents according to the present invention.

In FIG. 11, a flow diagram illustrating one exemplary embodiment of a method of distributing documents 12 according to the present invention is illustrated generally at 100. Reference is also made to FIGS. 1–10. In step 110, metadata files 18 are associated with documents 12. As described above, metadata files 18 identify document attributes 50 including, for example, a title, subject, author, date, and/or identification of documents 12. Next, in step 120, one or more content attributes 22 are applied to documents 12. Content attributes 22 are applied to documents 12 by metadata architecture system 20 based on document content 13 of documents 12. Then, in step 130, content groups 32 are assigned to documents 12. Content groups 32 are assigned to documents 12 by logic rules application system 30 based on content attributes 22 of documents 12. Thus, in step 140, one or more documents 12 are distributed to audience 14. Documents 12 are distributed to audience 14 by document distribution system 40 based on content groups 32.

Figure 12:
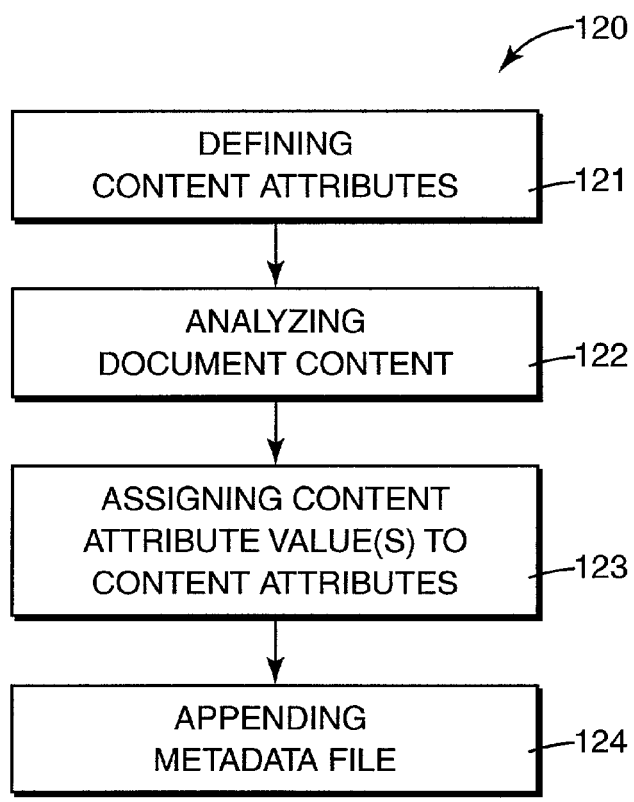
FIG. 12 is a flow diagram illustrating one exemplary embodiment of a method of applying content attributes to documents in the method of FIG. 11.

In one exemplary embodiment, as illustrated in FIG. 12, applying content attributes 22 to documents 12 in step 120 includes defining content attributes 22, as indicated in step 121. In addition, document content 13 of documents 12 is analyzed in step 122. As such, one or more content attribute values 23 are assigned to content attributes 22 in step 123 based on document content 13 as analyzed in step 122. Thus, metadata file 18 is appended as metadata file 18' in step 124 to include content attributes 22 and respective content attribute values 23.

Figure 13:
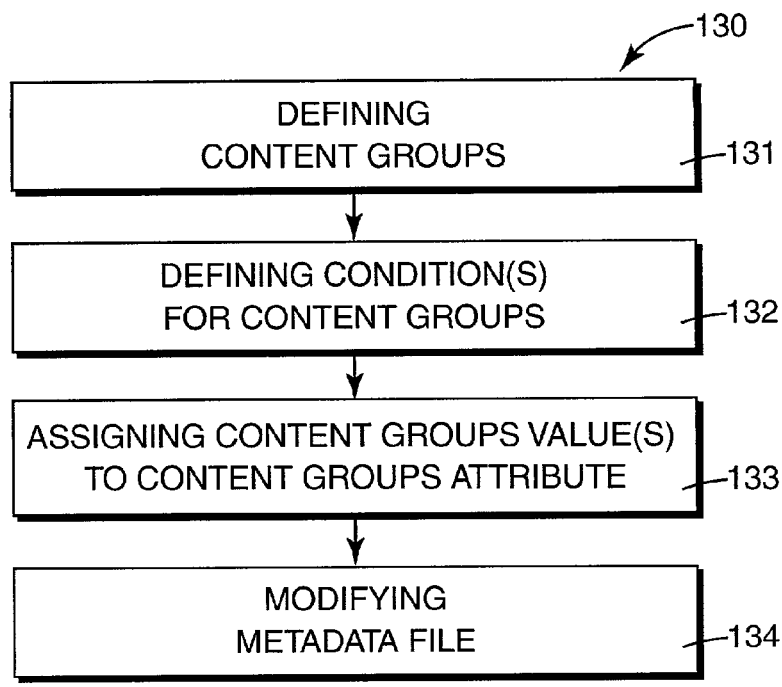
FIG. 13 is a flow diagram illustrating one exemplary embodiment of a method of assigning content groups to documents in the method of FIG. 11.

In one exemplary embodiment, as illustrated in FIG. 13, assigning content groups 32 to documents 12 in step 130 includes defining content groups 32, as indicated in step 131, and defining conditions 36 of logic rules 34 for content groups 32, as indicated in step 132. As such, one or more content groups values 39 are assigned to content groups attribute 38 in step 133 based on conditions 36 of logic rules 34 as defined in step 132. Thus, metadata file 18, and, more specifically, appended metadata file 18', is modified as metadata file 18" in step 134 to include content groups attribute 38 and content groups values 39.

Figure 14:
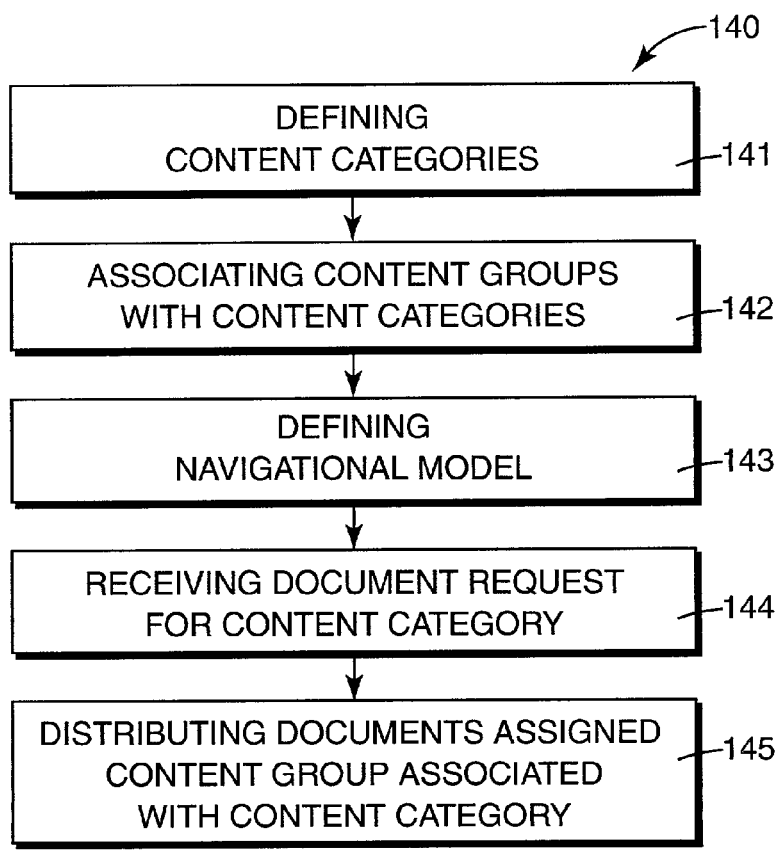
FIG. 14 is a flow diagram illustrating one exemplary embodiment of a method of distributing documents in the method of FIG. 11.

In one exemplary embodiment, as illustrated in FIG. 14, distributing documents 12 to audience 14 in step 140 includes defining content categories 42, as indicated in step 141. As such, one or more content groups 32 are associated with each content category 42, including each content sub-category 43, in step 142. In addition, navigational model 44 for content categories 42, including content sub-categories 43, is defined in step 143. Thus, document request 62 for a desired content category 42 or content sub-category 43 is received in step 144. Documents 12, therefore, which are assigned content group 32 which, in turn, is associated with the desired content category 42 or content sub-category 43 are distributed to audience 14 in step 145.

In one illustrative embodiment, document management system 10 is used to manage and distribute documents for a technical support Internet website. Document management system 10 is used, for example, to manage and distribute documents for a manufacturer of image processing products such as printers, photocopiers, scanners, faxes, etc. Documents 12, therefore, include content pertinent to such products. In addition, content categories 42 as identified by navigational model 44 include, for example, Setup & Maintain, Drivers & Downloads, Solve a Problem, Supplies & Accessories, Manuals, and Warranty Information. The Solve a Problem content category, for example, includes content sub-categories 43 such as Copying, Error Messages, Faxing, Printing, Scanning, and Software. Furthermore, the Printing content sub-category, for example, includes further content sub-categories 43 such as Error Messages, Paper Feed Issues, Slow Printing, Software, and Unexpected Output. As such, audience 14 can navigate navigational model 44 and review content categories 42 and/or content sub-categories 43.

When document management system 10 is used to manage and distribute documents for image processing products, for example, content attributes 22 and content groups 32 are defined accordingly by metadata architecture system 20 and logic rules application system 30, respectively. In the illustrative embodiment, content attributes 22 and respective content attribute values 23 of metadata architecture system 20 include, for example, User Task/Fix Problem, Content Topic/Component, Main Component/Paper Feed, Product Function/Faxing, Environment/Not Applicable, and Symptom/Feeding Issue. In addition, content groups 32 of logic rules application system 30 include, for example, Fix Problem, Setup & Install, Maintain, Uninstall, and Register. The Fix Problem content group, for example, includes content sub-groups such as Component, Symptom, Product Function, and Environment. Furthermore, the Symptom content sub-group, for example, includes further content sub-groups such as Print Feed Issue, Fax Feed Issue, Scan Quality, and Copy Quality. As such, content attributes 22 and respective content attribute values 23 of one condition 36 of logic rules 34 for content groups 32 include, for example, User Task/Fix Problem, Symptom/Feeding Issue, and Product Function/Faxing. Content attributes 22 and respective content attribute values 23 of another condition 36 of logic rules 34 for content groups 32 include, for example, User Task/Fix Problem, Main Component/Paper Feed, and Product Function/Faxing. Thus, in the illustrative embodiment, since content attributes 22 and respective content attribute values 23 satisfy one or more conditions 36, content groups value 39 of content groups attribute 38 includes, for example, Fix Problem/Symptom/Fax Feed Issue.

By assigning one or more content groups 32 to documents 12 and associating one or more content groups 32 with each content category 42 and/or content sub-category 43 identified by navigational model 44, documents 12 can be updated or replaced and, if necessary, reassigned one or more content groups 32 without affecting navigational model 44. Navigational model 44, therefore, may be maintained by host 40 and presented to audience 14 independent of changes to documents 12. Thus, navigational model 44, including content categories 42 and/or content sub-categories 43, can be modified or arranged independent of documents 12. As such, a data table identifying documents 12 and assigned content groups 32 can be maintained.

In addition, by assigning one or more content groups 32 to documents 12 and associating one or more content groups 32 with each content category 42 and/or content sub-category 43 identified by navigational model 44, new documents can be added to document management system 10 without the need for updating navigational model 44. Furthermore, changes in logic rules 34 can be applied consistently across all documents 12 without republishing of documents 12. Thus, document management system 10 can efficiently manage categorization and distribution of a large number of documents 12.

By associating one or more content groups 32 with each content category 42 and/or content sub-category 43 identified by navigational model 44, content groups 32 can be referenced by different navigational models 44 each including different content categories 42 and/or content sub-categories 43. Thus, the same documents can be referenced differently by different navigational models 44 and published in different manners. As such, content groups 32 do not define or limit content categories 42 and/or content sub-categories 43. In addition, by associating one or more content groups 32 with each content category 42 and/or content sub-category 43, document management system 10 can narrow or simplify the scope of content presented to audience 14 by navigational model 44.

Although specific embodiments have been illustrated and described herein for purposes of description of the preferred embodiment, it will be appreciated by those of ordinary skill in the art that a wide variety of alternate and/or equivalent implementations may be substituted for the specific embodiments shown and described without departing from the scope of the present invention. Those with skill in the chemical, mechanical, electromechanical, electrical, and computer arts will readily appreciate that the present invention may be implemented in a very wide variety of embodiments. This application is intended to cover any adaptations or variations of the preferred embodiments discussed herein. Therefore, it is manifestly intended that this invention be limited only by the claims and the equivalents thereof.

What is claimed is:

1. A method of distributing a plurality of documents, the method comprising:

associating a metadata file with each of the documents;

applying at least one content attribute to each of the documents, including analyzing a content of each of the documents and assigning a content attribute value to the content attribute of each of the documents based on the content thereof, and including appending the metadata file of each of the documents with the at least one content attribute and the content attribute value thereof;

assigning at least one content group to each of the documents based on the at least one content attribute and the content attribute value thereof, including modifying the metadata file of each of the documents to include the at least one content group thereof; and distributing the documents based on the at least one content group of each of the documents.

2. The method of claim 1, wherein associating the metadata file with each of the documents includes identifying at least one of a title, an author, a date, and an identification of each of the documents.

3. The method of claim 1, wherein assigning the at least one content group to each of the documents includes defining a plurality of content groups including the at least one content group, defining at least one condition for each of the content groups, and assigning the at least one content group to at least one of the documents if the at least one of the documents satisfies the at least one condition of the at least one content group.

4. The method of claim 3, wherein defining the at least one condition for each of the content groups includes specifying at least one of a plurality of content attributes including the at least one content attribute and a content attribute value for the at least one of the plurality of content attributes.

5. The method of claim 3, wherein assigning the at least one content group to the at least one of the documents includes assigning at least one content group value to a content group attribute of the at least one of the documents.

6. The method of claim 5, wherein modifying the metadata file of each of the documents to include the at least one content group includes modifying the metadata file of the at least one of the documents to include the at least one content group value for the content group attribute.

7. The method of claim 1, wherein distributing the documents includes defining a plurality of content categories, associating the at least one content group with at least one of the content categories, and distributing for the at least one of the content categories each of the documents assigned the at least one content group.

8. The method of claim 7, wherein defining the plurality of content categories includes defining at least one content sub-category for the at least one of the content categories, and wherein associating the at least one content group with the at least one of the content categories includes associating the at least one content group with the at least one content sub-category.

9. The method of claim 7, wherein distributing the documents includes defining a navigational model identifying the content categories, presenting the navigational model to an audience, receiving a request for documents associated with one of the content categories from the audience, and distributing the documents associated with the one of the content categories to the audience, including distributing the documents assigned the at least one content group associated with the at least one of the content categories.

10. The method of claim 9, wherein distributing the documents further includes defining a communication link between a host of the navigational model and the audience, wherein receiving the request for documents includes receiving the request for documents associated with the one of the content categories from the audience via the communication link, and wherein distributing the documents includes distributing the documents associated with the one of the content categories to the audience via the communication link.

11. The method of claim 10, wherein defining the communication link includes defining an Internet communication link between the host of the navigational model and the audience.

12. A method of distributing a plurality of documents, the method comprising:

associating a metadata file with each of the documents;

applying a content attribute to each of the documents, including analyzing a content of each of the documents and assigning a content attribute value to the content attribute of each of the documents based on the content thereof, and including appending the metadata file of each of the documents with the content attribute and the content attribute value thereof;

assigning a content group to each of the documents based on the content attribute and the content attribute value thereof, including modifying the metadata file of each of the documents to include the content group thereof;

defining a plurality of content categories, including associating the content group with at least one of the content categories; and distributing for the at least one of the content categories each of the documents assigned the content group.

13. The method of claim 12, wherein assigning the content group to each of the documents includes defining a plurality of content groups including the content group, defining a condition for each of the content groups, and assigning at least one of the content groups to at least one of the documents if the at least one of the documents satisfies the condition of the at least one of the content groups.

14. The method of claim 13, wherein defining the condition for each of the content groups includes specifying at least one of a plurality of content attributes including the content attribute and a content attribute value for the at least one of the plurality of content attributes.

* * * * *